(12) United States Patent
Yu

(10) Patent No.: US 10,091,103 B2
(45) Date of Patent: Oct. 2, 2018

(54) EFFICIENT SYNCHRONIZATION OF STORED INFORMATION USING A PARALLEL RING NETWORK TOPOLOGY

(71) Applicant: Juniper Networks, Inc., Sunnyvale, CA (US)

(72) Inventor: Tao Yu, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 133 days.

(21) Appl. No.: 15/136,236

(22) Filed: Apr. 22, 2016

(65) Prior Publication Data

US 2017/0310587 A1  Oct. 26, 2017

(51) Int. Cl.
| | |
|---|---|
| *H04L 12/741* | (2013.01) |
| *H04L 12/933* | (2013.01) |
| *H04L 29/08* | (2006.01) |
| *H04L 12/813* | (2013.01) |
| *H04L 12/751* | (2013.01) |
| *G06F 17/30* | (2006.01) |

(52) U.S. Cl.
CPC .............. *H04L 45/74* (2013.01); *H04L 45/02* (2013.01); *H04L 47/20* (2013.01); *H04L 49/102* (2013.01); *H04L 67/1095* (2013.01); *G06F 17/30* (2013.01)

(58) Field of Classification Search
CPC ......... H04L 45/75; H04L 45/02; H04L 47/20; H04L 49/102; H04L 67/1095; H04L 45/74; G06F 17/30
USPC ........................................................ 370/392
See application file for complete search history.

(56) References Cited

U.S. PATENT DOCUMENTS

| | | | | |
|---|---|---|---|---|
| 5,742,774 A * | 4/1998 | Al-Salameh | ............ | H04J 3/085 370/401 |
| 5,937,343 A * | 8/1999 | Leung | ............... | G06F 17/30575 370/337 |
| 6,202,082 B1 * | 3/2001 | Tomizawa | .............. | H04J 3/085 370/389 |
| 8,391,180 B2 * | 3/2013 | Karandikar | ........... | H04L 12/437 370/254 |
| 8,572,290 B1 * | 10/2013 | Mukhopadhyay | .......................... | G06F 17/30094 709/251 |
| 9,647,917 B2 * | 5/2017 | Hasha | ................. | H04L 43/0876 |

(Continued)

*Primary Examiner* — Un C Cho
*Assistant Examiner* — Shah Rahman
(74) *Attorney, Agent, or Firm* — Harrity & Harrity, LLP

(57) ABSTRACT

A routing system may include a primary message group to be used for synchronizing stored information. The primary message group may include multiple primary network devices. The multiple primary network devices may be configured with a first configuration regarding synchronizing the stored information. The primary message group may form a ring network topology. The routing system may include a secondary message group to be used for synchronizing the stored information. The secondary message group may include a single primary network device, of the multiple primary network devices, and multiple secondary network devices. Each secondary network device, of the multiple secondary network devices, may be included in a single secondary message group. The multiple secondary network devices may be configured with a second configuration regarding synchronizing the stored information. The secondary message group may form a different ring network topology.

20 Claims, 8 Drawing Sheets

(56) References Cited

U.S. PATENT DOCUMENTS

| | | | | |
|---|---|---|---|---|
| 2002/0018481 | A1* | 2/2002 | Mor | H04L 12/423 370/403 |
| 2003/0154315 | A1* | 8/2003 | Sultan | H04L 12/437 709/251 |
| 2005/0050136 | A1* | 3/2005 | Golla | H04L 45/02 709/200 |
| 2008/0222447 | A1* | 9/2008 | Ram | H04L 12/42 714/2 |
| 2009/0268609 | A1* | 10/2009 | Koch | H04L 12/423 370/222 |
| 2011/0176550 | A1* | 7/2011 | Wang | H04L 12/42 370/392 |
| 2012/0147740 | A1* | 6/2012 | Nakash | H04L 12/437 370/221 |
| 2014/0078927 | A1* | 3/2014 | Thubert | H04L 45/507 370/254 |
| 2014/0169155 | A1* | 6/2014 | Li | H04L 12/42 370/223 |
| 2014/0280700 | A1* | 9/2014 | Maitland | H04L 69/02 709/217 |
| 2015/0131991 | A1* | 5/2015 | Hattori | H04J 14/0212 398/47 |
| 2015/0381483 | A1* | 12/2015 | Kompella | H04L 41/0896 370/258 |
| 2015/0381500 | A1* | 12/2015 | Kompella | H04L 45/50 370/231 |
| 2017/0289014 | A1* | 10/2017 | Hsu | H04L 45/02 |

* cited by examiner

EFFICIENT SYNCHRONIZATION OF STORED INFORMATION USING A PARALLEL RING NETWORK TOPOLOGY

BACKGROUND

A router may refer to a network device that routes and/or forwards packets between computer networks and/or network devices. A packet is typically forwarded from one router to another through the networks that constitute the Internet until the packet reaches a destination device. When a packet is received by a router, the router may read address information included in the packet to determine the destination for the packet. Then, using information stored in a routing table or indicated by a routing policy, the router may direct the packet toward the destination.

SUMMARY

According to some possible implementations, a primary device may include one or more processors to generate or receive a synchronization message associated with synchronizing information stored by multiple devices. The one or more processors may identify a downstream primary device, included in a primary group with the primary device, to which the synchronization message is to be sent. The primary group may form a ring network topology. The one or more processors may identify a downstream secondary device, included in a secondary group with the primary device, to which the synchronization message is to be sent. The downstream secondary device may be different from the downstream primary device. The secondary group may form another ring network topology. The one or more processors may send the synchronization message to the downstream primary device and the downstream secondary device. The one or more processors may receive a secondary completion message that indicates that all secondary devices, included in the secondary group, have received the synchronization message. The one or more processors may send a primary completion message to the downstream primary device based on receiving the secondary completion message.

According to some possible implementations, a method may include generating or receiving, by a primary device, a synchronization message associated with synchronizing information stored by the primary device and other devices. The method may include identifying, by the primary device, a downstream primary device to which the synchronization message is to be sent. The downstream primary device may be included in a primary group with the primary device. The primary group may form a ring network topology. The downstream primary device may be downstream from the primary device in the ring network topology. The method may include identifying, by the primary device, a downstream secondary device to which the synchronization message is to be sent. The downstream secondary device may be included in a secondary group with the primary device. The secondary group may form another ring network topology. The downstream secondary device may be downstream from the primary device in the other ring network topology. The method may include selectively sending, by the primary device, the synchronization message to the downstream primary device and the downstream secondary device for parallel processing.

According to some possible implementations, a routing system may include a primary message group to be used for synchronizing stored information. The primary message group may include a plurality of primary network devices. The plurality of primary network devices may be configured with a first configuration regarding synchronizing the stored information. The primary message group may form a ring network topology. The routing system may include a secondary message group to be used for synchronizing the stored information. The secondary message group may include a single primary network device, of the plurality of primary network devices, and a plurality of secondary network devices. Each secondary network device, of the plurality of secondary network devices, may be included in a single secondary message group. The plurality of secondary network devices may be configured with a second configuration regarding synchronizing the stored information. The secondary message group may form a different ring network topology.

DETAILED DESCRIPTION

The following detailed description of example implementations refers to the accompanying drawings. The same reference numbers in different drawings may identify the same or similar elements.

A routing system may include multiple network devices (e.g., routers, gateways, firewalls, etc.) for packet processing. In some cases, the network devices may form a distributed routing system without a centralized network device to assist the network devices with packet processing. In this case, the network devices may need to be synchronized to ensure consistent packet processing. For example, the network devices may exchange messages to synchronize information stored by the network devices, such as entries in a flow table. A flow table entry may identify a flow (e.g., a set of related packets), and may indicate an action to be taken with respect to the flow (e.g., drop packets or forward packets). Implementations described herein permit multiple network devices to synchronize stored information (e.g., flow table entries or other information stored in a data structure) in an efficient manner that conserves bandwidth and reduces synchronization delays, which may reduce packet processing errors and increase throughput.

Figure 1A:
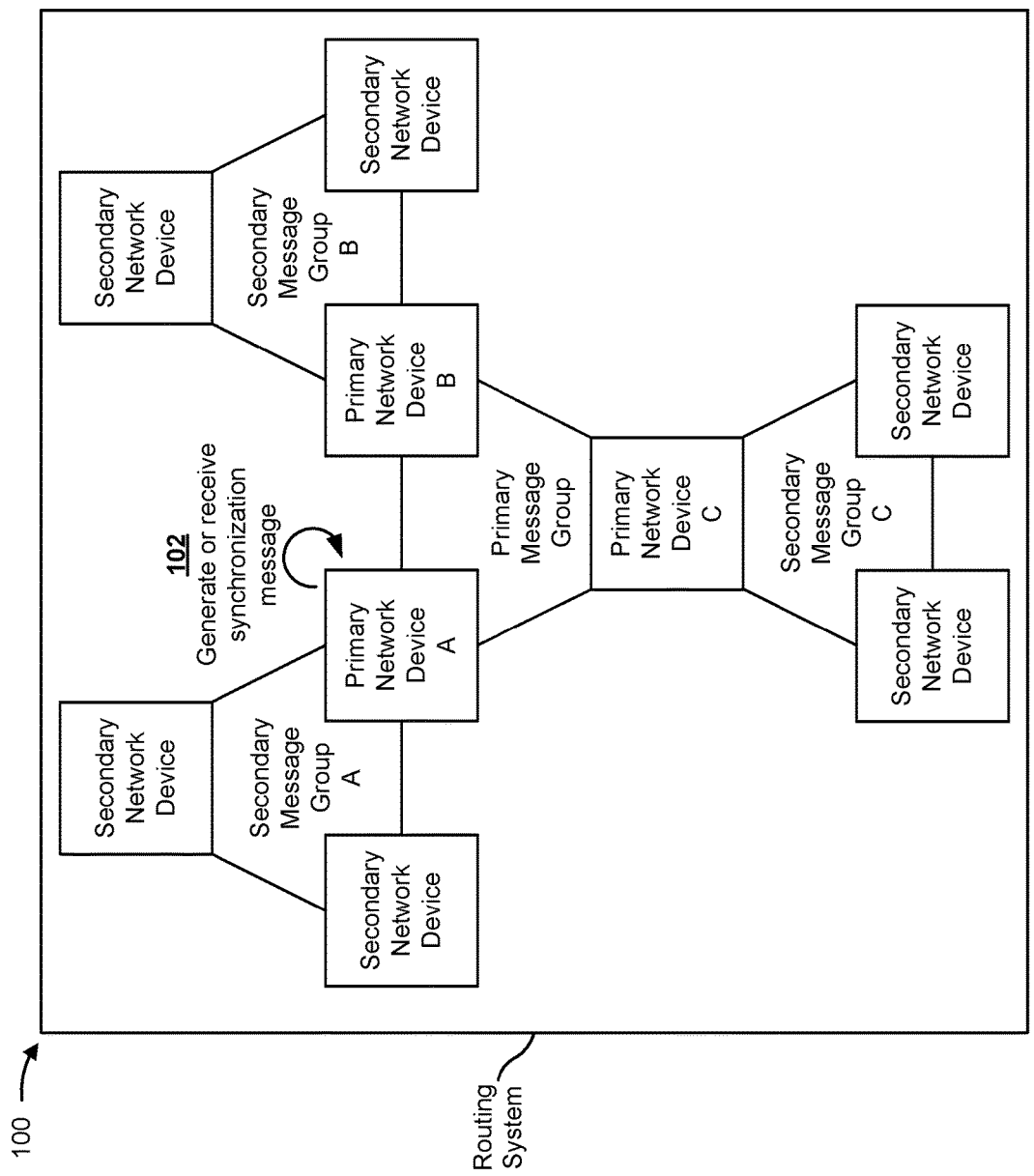
FIGS. 1A-1E are diagrams of an overview of an example implementation described herein.

FIGS. 1A-1E are diagrams of an overview of an example implementation 100 described herein. As shown in FIG. 1A, a routing system may include multiple network devices, such as routers, gateways, firewalls, or the like. A network device may be configured as a primary network device or a secondary network device. As shown, the primary network devices included in the routing system may form a primary message group with a ring network topology. As further shown, a primary network device and a set of secondary network devices may form a secondary message group with a ring network topology.

As shown in FIG. 1A, and by reference number 102, a first primary network device, shown as Primary Network Device A, may generate or receive a synchronization message. A synchronization message may be used to synchronize information (e.g., a flow table entry) stored by multiple network devices. In some implementations, Primary Network Device A may generate the synchronization message, such as when the Primary Network Device A initiates the creation, deletion, or modification of a flow table entry. In some implementations, Primary Network Device A may receive the synchronization message. For example, a secondary network device, included in a secondary message group with Primary Network Device A, may initiate the creation, deletion, or modification of a flow table entry, may generate the synchronization message, and may send the synchronization message to Primary Network Device A.

Figure 1B:
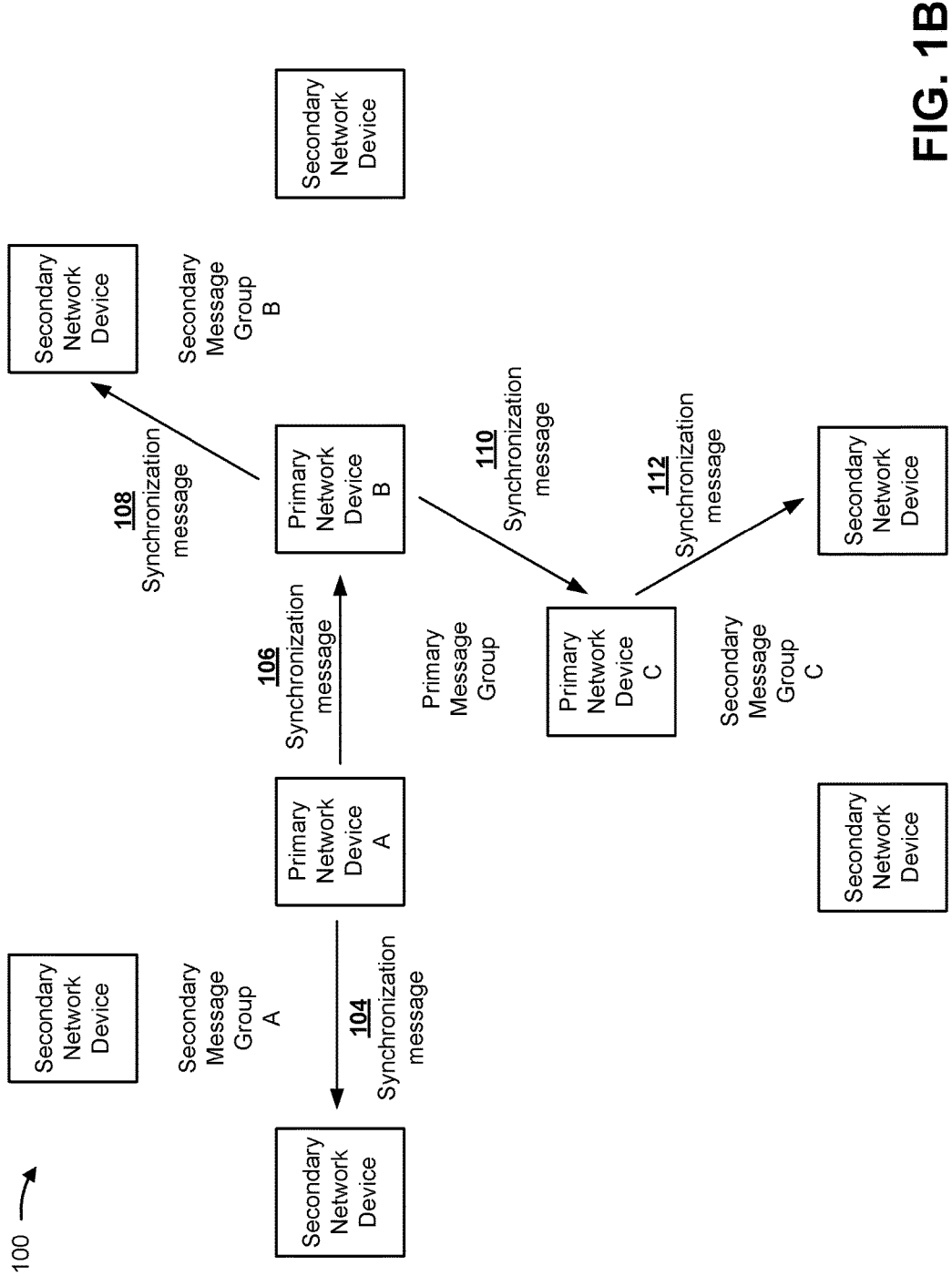

As shown in FIG. 1B, and by reference number 104, Primary Network Device A may send the synchronization message downstream to a secondary network device included in a first secondary message group with Primary Network Device A, shown as Secondary Message Group A. Furthermore, as shown by reference number 106, Primary Network Device A may send the synchronization message downstream to a second primary network device, shown as Primary Network Device B, included in a primary message group with Primary Network Device A. In some implementations, Primary Network Device A may send these synchronization messages in parallel to reduce synchronization delay.

As shown by reference number 108, Primary Network Device B may send the synchronization message downstream to a secondary network device included in a second secondary message group with Primary Network Device B, shown as Secondary Message Group B. Furthermore, as shown by reference number 110, Primary Network Device B may send the synchronization message downstream to a third primary network device included in the primary message group, shown as Primary Network Device C. In some implementations, Primary Network Device B may send these synchronization messages in parallel to reduce synchronization delay.

As shown by reference number 112, Primary Network Device C may send the synchronization message downstream to a secondary network device included in a third secondary message group with Primary Network Device C, shown as Secondary Message Group C. In this way, the synchronization messages may be transmitted and processed throughout the primary message group and the secondary message groups in parallel, thereby reducing synchronization delay. In some implementations, Primary Network Device C may not send the synchronization message to Primary Network Device A because the Primary Network Device A is the source of the synchronization message and has already processed the synchronization message. This conserves network resources.

Figure 1C:
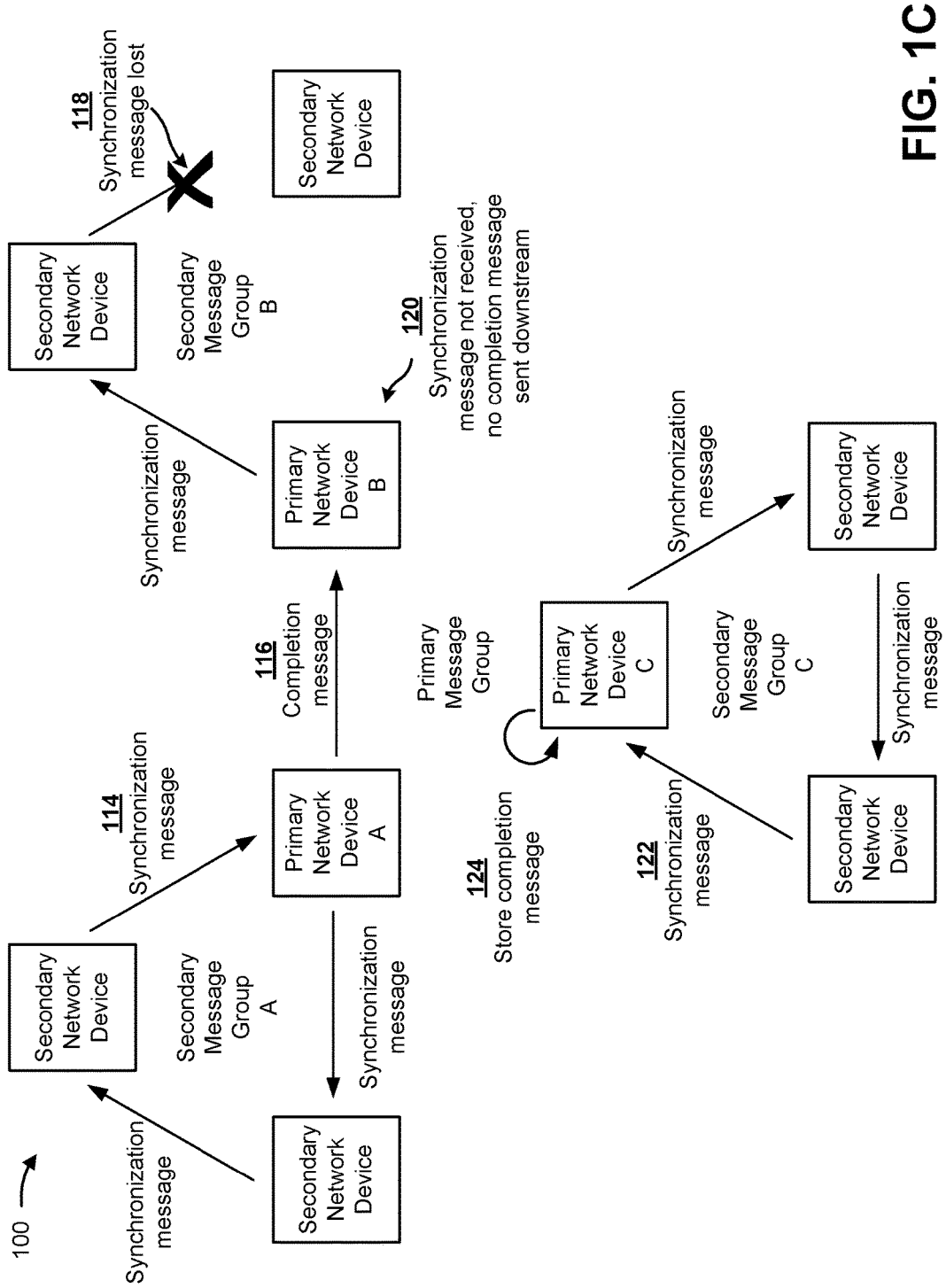

As shown in FIG. 1C, and by reference number 114, the secondary network devices included in Secondary Message Group A may each send a synchronization message downstream until the synchronization message is received by Primary Network Device A. When a secondary network device receives the synchronization message, the secondary network device may execute an instruction indicated in the synchronization message to synchronize information (e.g., a flow table entry) stored by the secondary network device. When Primary Network Device A receives the synchronization message, Primary Network Device A may send a completion message downstream to Primary Network Device B, as shown by reference number 116. The completion message may indicate that all secondary network devices, included in Secondary Message Group A, have received the synchronization message (e.g., and are therefore synchronized). Primary Network Device B may store the completion message.

As shown by reference number 118, the secondary network devices included in Secondary Message Group B may fail to synchronize, such as when the synchronization message is lost or dropped within Secondary Message Group B. Thus, as shown by reference number 120, Primary Network Device B may not receive a synchronization message from a secondary network device included in Secondary Message Group B, and may not send a completion message downstream to Primary Network Device C.

As shown by reference number 122, the secondary network devices included in Secondary Message Group C may each send a synchronization message downstream until the synchronization message is received by Primary Network Device C. When Primary Network Device C receives the synchronization message, Primary Network Device C may store a completion message, as shown by reference number 124. However, Primary Network Device C may not send the completion message to Primary Network Device A because Primary Network Device C has not received a completion message from Primary Network Device B. In some implementations, a completion message may be sent to a downstream network device only when a completion message has been received from an upstream network device. In this way, the network devices may efficiently manage re-transmission of synchronization messages, as described below.

Figure 1D:
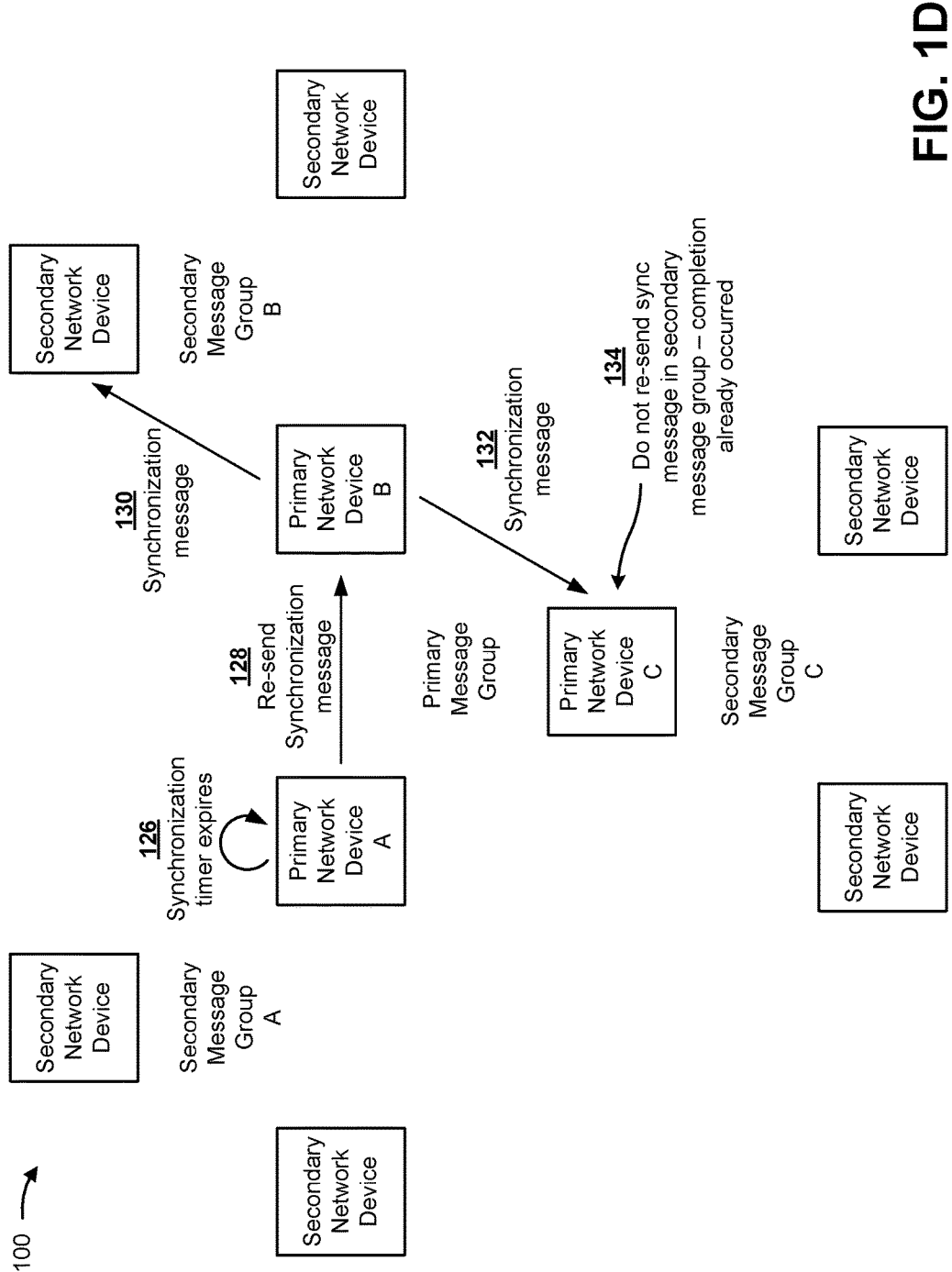

As shown in FIG. 1D, and by reference number 126, a synchronization timer, stored by Primary Network Device A, may expire. Based on the expiration of the synchronization timer, Primary Network Device A may re-send a synchronization message to Primary Network Device B, as shown by reference number 128. In a similar manner as described above in connection with FIG. 1B (reference numbers 108 and 110), Primary Network Device B may send the synchronization message downstream to a secondary network device included in Secondary Message Group B, as shown by reference number 130, and may send the synchronization message downstream to Primary Network Device C, as shown by reference number 132.

As shown by reference number 134, Primary Network Device C may prevent the synchronization message from being re-sent to a secondary network device included in Secondary Message Group C because Primary Network Device C stores a completion message indicating that the secondary network devices included in Secondary Message Group C have already been synchronized. In this way, Primary Network Device C may conserve network resources by preventing unnecessary re-transmission of the synchronization message, and may conserve computing resources of the secondary network devices included in Secondary Message Group C by preventing unnecessary re-processing of synchronization messages.

Figure 1E:
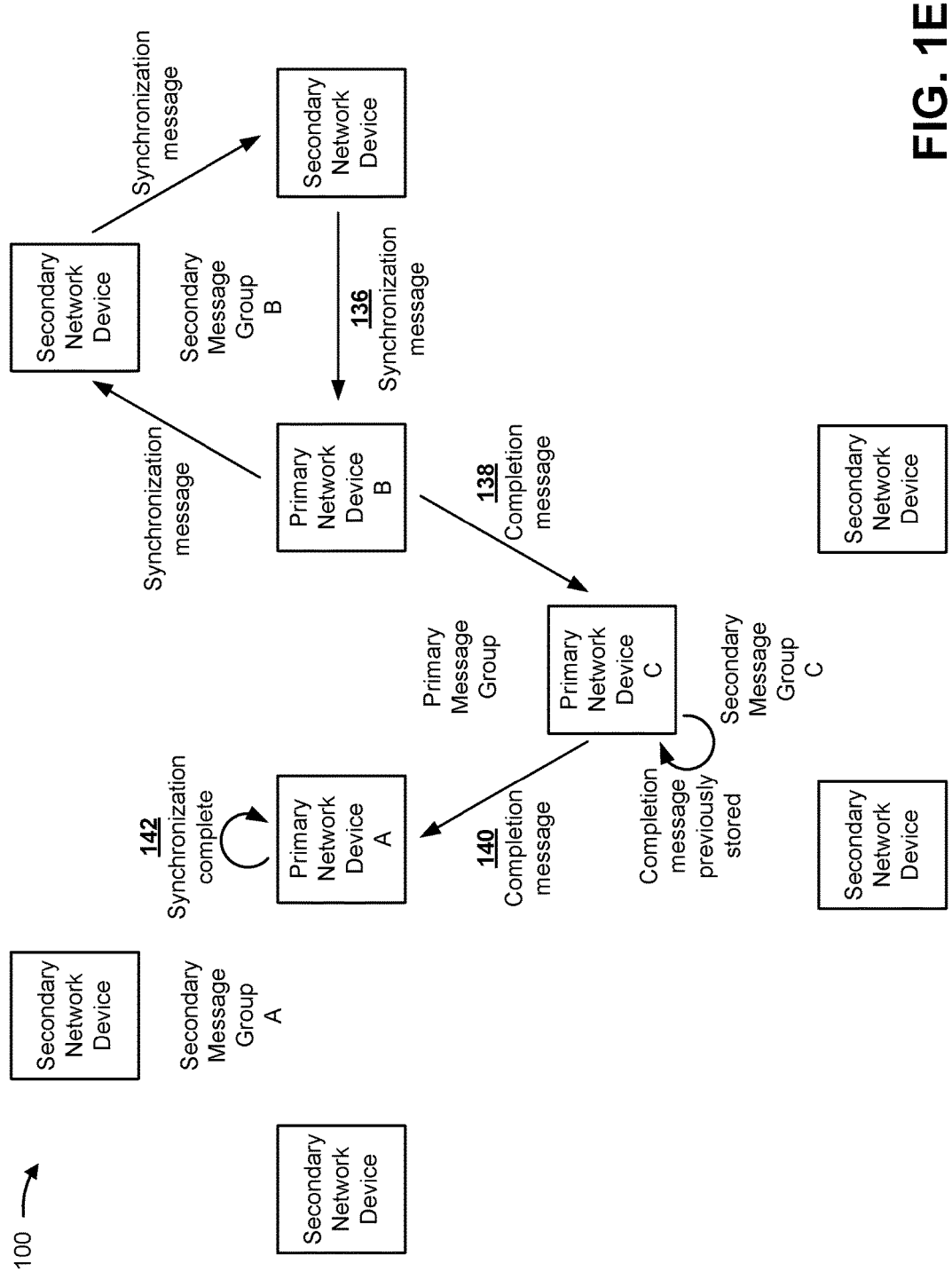

As shown in FIG. 1E, and by reference number 136, the secondary network devices included in Secondary Message Group B may each send a synchronization message downstream until the synchronization message is received by Primary Network Device B. When Primary Network Device B receives the synchronization message, Primary Network Device B may send a completion message to Primary Network Device C, as shown by reference number 138. Primary Network Device B may send the completion message because Primary Network Device B has previously received (and stored) a completion message from Primary Network Device A, as described above in connection with FIG. 1C (reference number 116), and because Primary Network Device B has received a synchronization message from the secondary network device included in Secondary Message Group B.

As shown by reference number 140, based on receiving the completion message from Primary Network Device B, and further based on storing a completion message indicating that the secondary network devices included in Secondary Message Group C are synchronized, Primary Network Device C may send a completion message to Primary Network Device A. As shown by reference number 142, Primary Network Device A may store an indication that synchronization is complete (e.g., for the synchronization message sent by Primary Network Device A). In this way, the routing system may efficiently synchronize multiple network devices while reducing bandwidth consumption (e.g., by reducing transmission of redundant messages) and conserving computing resources (e.g., by reducing storage and/or processing of redundant messages).

As indicated above, FIGS. 1A-1E are provided merely as an example. Other examples are possible and may differ from what was described with regard to FIGS. 1A-1E.

Figure 2:
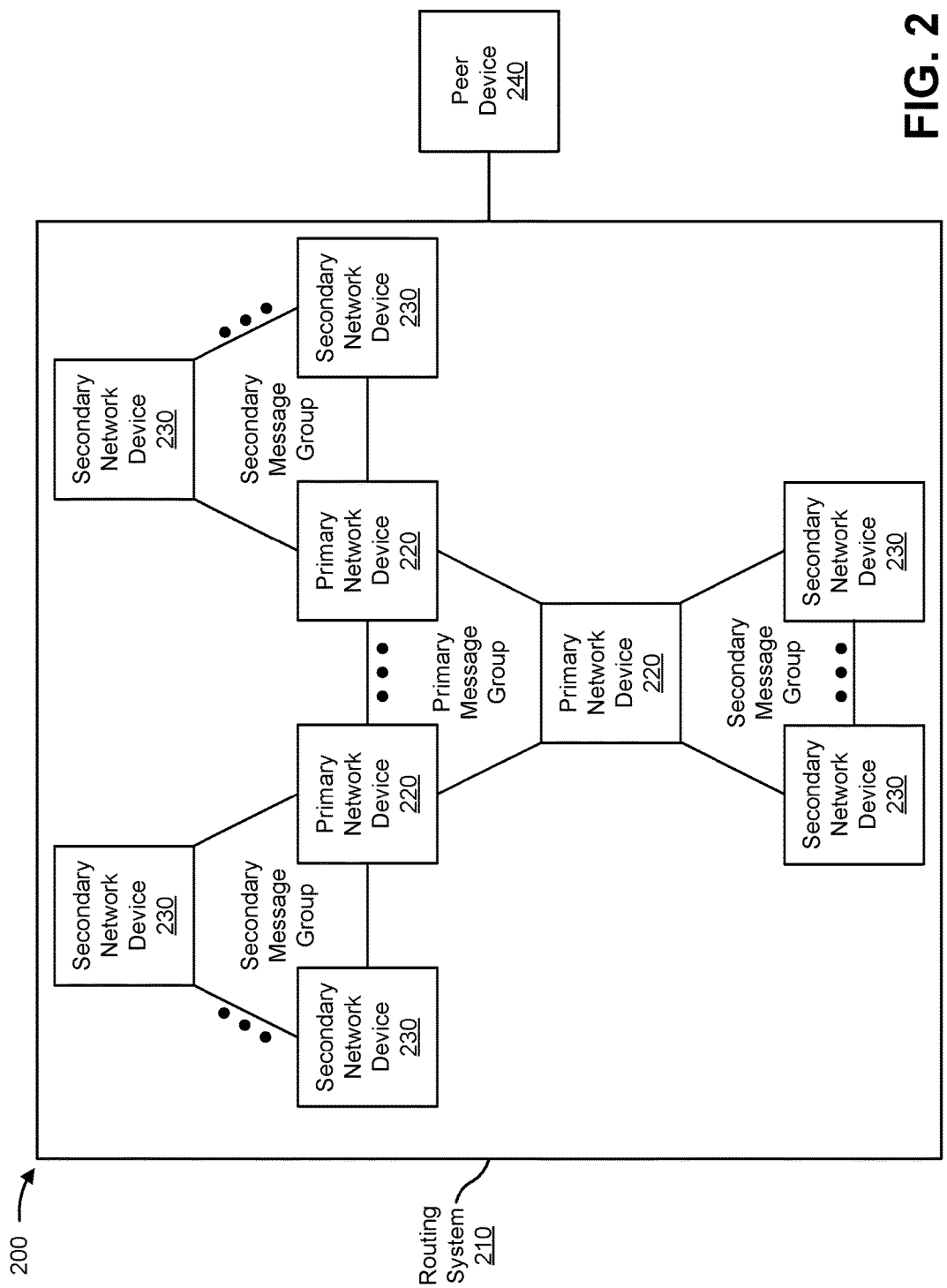
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a routing system 210, which may include a set of primary network devices 220 and a set of secondary network devices 230. Furthermore, environment 200 may include a peer device 240. Devices of environment 200 may interconnect via wired connections, wireless connections, or a combination of wired and wireless connections.

Routing system 210 includes multiple network devices. A network device may be configured as a primary network device 220 or as a secondary network device 230. For example, routing system 210 may include a set of primary network devices 220 and a set of secondary network devices 230. As shown, primary network devices 220 included in routing system 210 may form a primary message group (also referred to as a primary group) with a ring network topology. As further shown, a primary network device 220 and a set of secondary network devices 230 may form a secondary message group (also referred to as a secondary group) with a ring network topology. In a ring network topology, each network device connects to exactly two other network devices (e.g., an upstream network device and a downstream network device), forming a single continuous pathway for messages through each network device. In some implementations, information in a ring network topology may flow in a single direction, from an upstream network device to a downstream network device (e.g., and eventually back to an initial network device that initiated transmission of the information).

In the network topology shown in FIG. 2 (e.g., a parallel ring network topology), each secondary network device connects to (e.g., communicates with) exactly two other network devices, and each primary network device connects to (e.g., communicates with) exactly four other network devices (e.g., two primary network devices in the primary message group and two secondary network devices in the secondary message group). Thus, each secondary network device is included in one ring network, and each primary network device is included in two ring networks.

In some implementations, routing system 210 may include a single primary message group, and every primary network device 220 in routing system 210 may be included in the single primary message group. Additionally, or alternatively, routing system 210 may include multiple secondary message groups, and each secondary network device 230 included in routing system 210 may be included in a single secondary message group of the multiple secondary message groups. In other words, a single secondary network device 230 may not be included in more than one secondary message group, in some implementations.

In some implementations, two or more network devices of routing system 210 may be located proximate to one another (e.g., in a same chassis, in a same rack, in a same data center, in a same geographic location, etc.). In some implementations, two or more network devices of routing system 210 may be located remote from one another (e.g., in different chassis, in different racks, in different data centers, in different geographic locations, etc.). In some implementations, the quantity of secondary network devices 230 included in routing system 210 may be greater than the quantity of primary network devices 220 included in routing system 210.

Primary network device 220 includes one or more devices (e.g., one or more traffic transfer devices) capable of processing and transferring traffic. For example, primary network device 220 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. Primary network device 220 may store information (e.g., flow table entries, routing table entries, or forwarding table entries) to be synchronized across multiple (e.g., all) network devices included in routing system 210. In some implementations, a primary network device 220 may be referred to as a primary device.

Secondary network device 230 includes one or more devices (e.g., one or more traffic transfer devices) capable of processing and transferring traffic. For example, secondary network device 230 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. Secondary network device 230 may store information (e.g., flow table entries, routing table entries, or forwarding table entries) to be synchronized across multiple (e.g., all) network devices included in routing system 210. In some implementations, a secondary network device 230 may be referred to as a secondary device.

Peer device 240 includes one or more devices capable of receiving and/or providing network traffic. For example, peer device 240 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. Additionally, or alternatively, peer device 240 may include an endpoint device that is a source or a destination for network traffic. For example, peer device 240 may include a computer or a similar type of device. Peer device 240 may receive network traffic from and/or may provide network traffic to primary network device 220 and/or secondary network device 230 included in routing system 210.

The number and arrangement of devices and networks shown in FIG. 2 are provided as an example. In practice, there may be additional devices, fewer devices, different, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
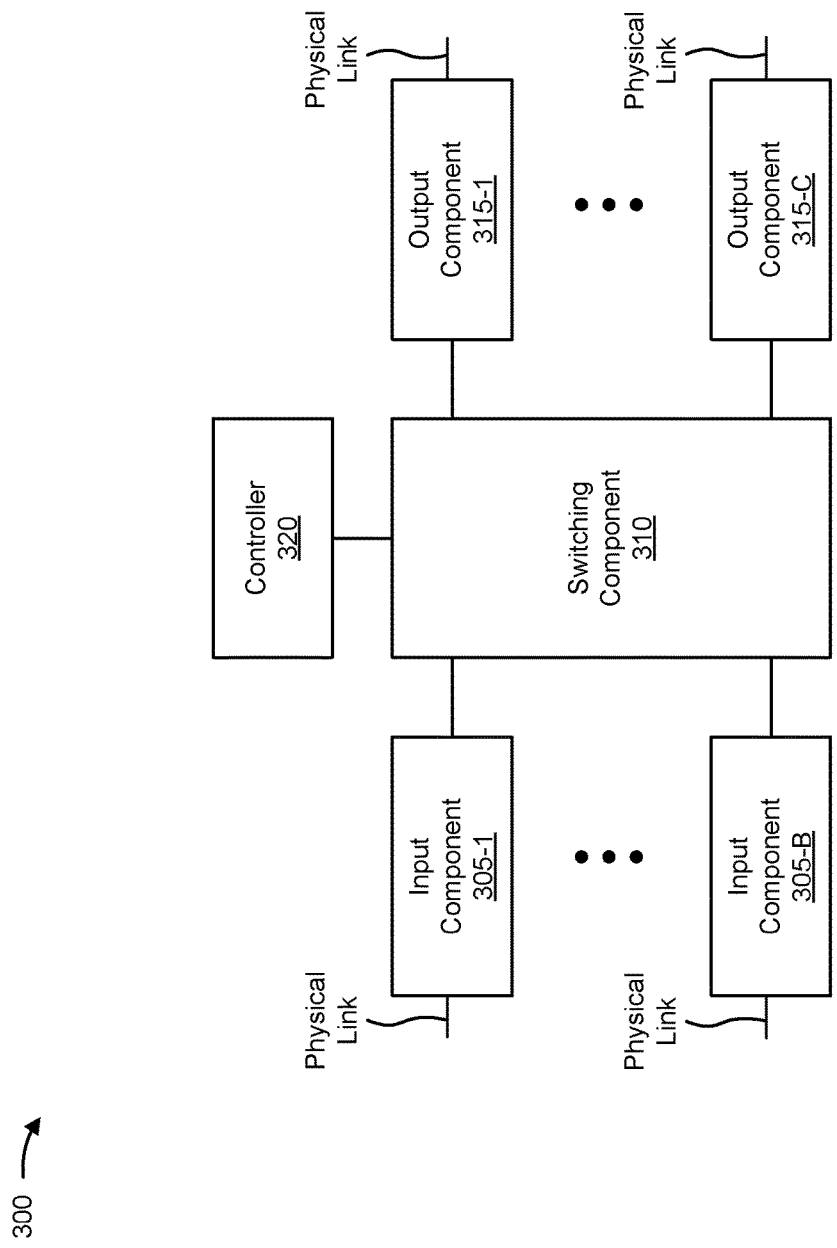
FIG. 3 is a diagram of example components of one or more devices of FIG. 2.

FIG. 3 is a diagram of example components of a device 300. Device 300 may correspond to routing system 210, primary network device 220, secondary network device 230, and/or peer device 240. In some implementations, routing system 210, primary network device 220, secondary network device 230, and/or peer device 240 may include one or more devices 300 and/or one or more components of device 300. As shown in FIG. 3, device 300 may include a set of input components 305, a switching component 310, a set of output components 315, and a controller 320. In some implementations, components of devices 300 may interconnect via wired connections.

Input component 305 includes a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 includes a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a microprocessor, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
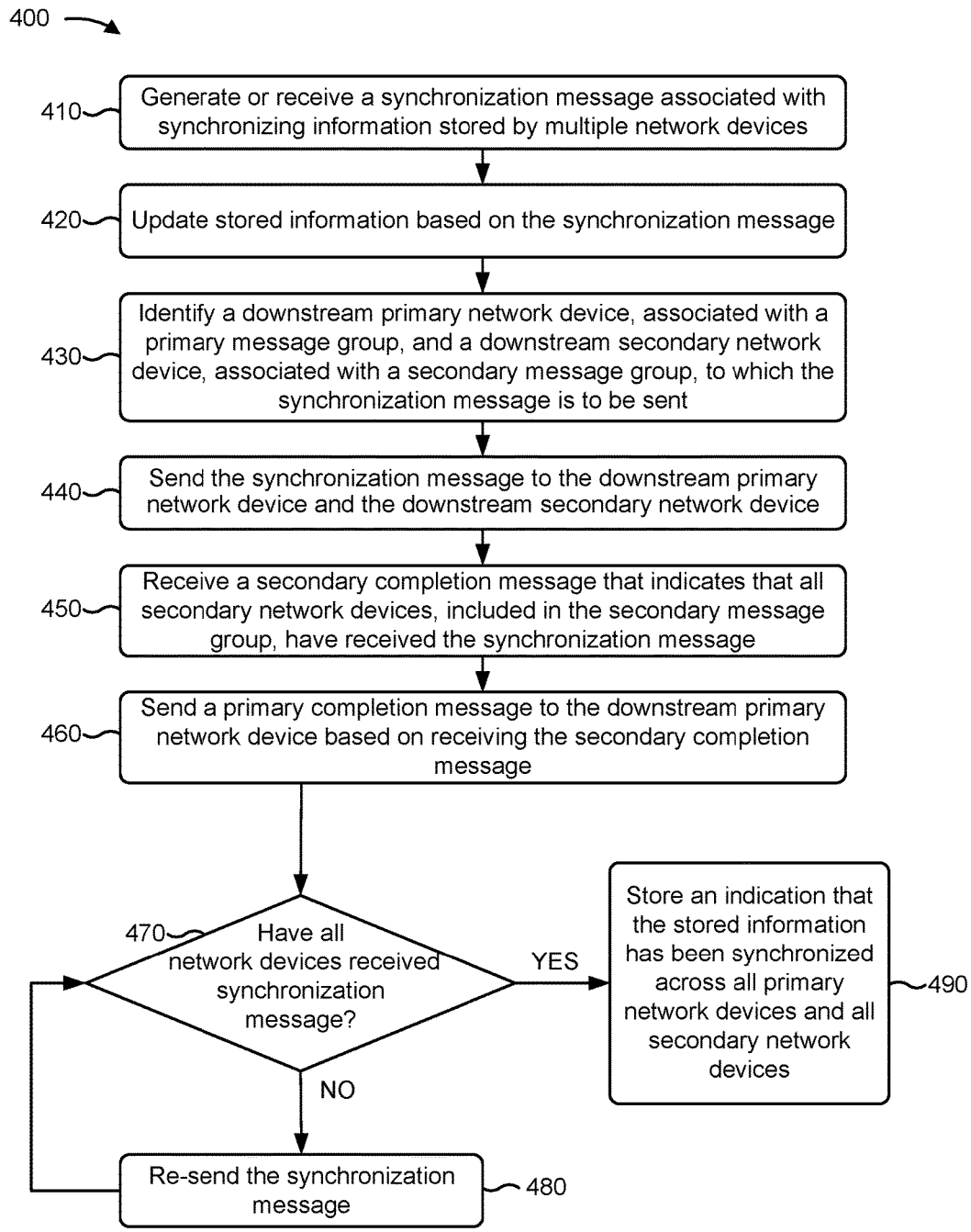
FIG. 4 is a flow chart of an example process for efficient synchronization of stored information using a parallel ring network topology.

FIG. 4 is a flow chart of an example process 400 for efficient synchronization of stored information using a parallel ring network topology. In some implementations, one or more process blocks of FIG. 4 may be performed by primary network device 220. In some implementations, one or more process blocks of FIG. 4 may be performed by another device or a group of devices separate from or including primary network device 220, such as routing system 210, secondary network device 230, and/or peer device 240.

As shown in FIG. 4, process 400 may include generating or receiving a synchronization message associated with synchronizing information stored by multiple network devices (block 410). For example, primary network device 220 may receive and/or generate a synchronization message, such as an entry management message. The synchronization message may indicate an action to be performed by a network device that receives the synchronization message (e.g., based on an instruction included in the synchronization message). For example, a network device that receives an entry management message may execute an instruction associated with modifying a flow table (e.g., to add, delete, or update an entry in the flow table). A flow table may store entries, which may include a flow identifier that identifies a packet flow (e.g., 5-tuple information, such as a source address, a source port identifier, a destination address, a destination port identifier, or a protocol identifier) and information that identifies an action to be performed when a packet, included in the packet flow, is received by a network device (e.g., drop, forward, copy, store, or monitor the packet).

The synchronization message may be sent to all network devices included in routing system 210 to synchronize information stored by the network devices. For example, an entry management message may be sent to all of the network devices to synchronize flow tables stored by the network devices. While some implementations are described herein in connection with entry management messages and synchronizing flow tables, process 400 may be applied to any type of synchronization message that is to be delivered to multiple devices to synchronize information stored by the devices. Additionally, or alternatively, implementations described herein may be used to synchronize data structures other than flow tables, such as routing tables, forwarding tables, or the like.

In some implementations, primary network device 220 may generate the synchronization message, such as when primary network device 220 initiates the creation, deletion, or modification of a flow table entry or other information to be synchronized. In some implementations, primary network device 220 may receive the synchronization message. For example, secondary network device 230, included in a secondary message group with primary network device 220, may initiate the creation, deletion, or modification of a flow table entry or other information to be synchronized, may generate the synchronization message, and may send the synchronization message to primary network device 220.

In some implementations, the synchronization message may include information that identifies a type of the synchronization message (e.g., add, delete, update, etc.). Additionally, or alternatively, the synchronization message may include a primary message group size indicator that indicates a quantity of primary network devices 220 included in the primary message group. In some implementations, the primary message group size indicator may be used as a time-to-live counter, such that the synchronization message is discarded when the time-to-live counter expires (e.g., when the synchronization message has been transmitted to all primary network devices 220 included in the primary message group). Additionally, or alternatively, the synchronization message may include a source device identifier that identifies a source of the synchronization message, such as a primary network device 220 or secondary network device 230.

Additionally, or alternatively, the synchronization message may include an initial primary device identifier that identifies the initial (e.g., first) primary network device 220 to send the synchronization message within the primary message group. For example, the initial primary device identifier may identify a primary network device 220 that initiated creation of the synchronization message or that is included in a secondary network group with a secondary network device 230 that initiated creation of the synchronization message.

As further shown in FIG. 4, process 400 may include updating stored information based on the synchronization message (block 420). For example, primary network device 220 may perform an action based on information included in the synchronization message (e.g., based on executing an instruction included in the synchronization message), such as adding, deleting, or updating a flow table entry. If primary network device 220 generates the synchronization message (e.g., is a source of the synchronization message, or initiates creation of the synchronization message), then primary network device 220 may perform the action before, after, or in parallel with generating the synchronization message. If primary network device 220 receives the synchronization message (e.g., is not a source of the synchronization message, or does not initiate creation of the synchronization message), then primary network device 220 may perform the action after receiving the synchronization message.

In some implementations, information stored by a network device may be active information (e.g., an active entry in a flow table). Active information may refer to information that is editable by a network device that stores the active information without requiring the network device to receive an instruction from another network device to edit the active information. For example, a network device may store active information when the network device initiated the creation of the active information (e.g., when the network device is a source of a synchronization message for the active information).

In some implementations, information stored by a network device may be passive information (e.g., a passive entry in a flow table). Passive information may refer to information that is not editable by a network device that stores the passive information unless the network device receives an instruction from another network device (e.g., a source that initiated creation of the passive information) to edit the passive information. For example, a network device may store passive information when the network device did not initiate the creation of the passive information (e.g., when the network device is not a source of a synchronization message for the passive information).

In some implementations, passive information may be edited only when a synchronization message, relating to the passive information, is received from a network device that initiated creation of the passive information. In this case, the synchronization message may include a source device identifier (e.g., an Internet Protocol (IP) address, a media access control (MAC) address, etc.) that identifies a network device that is the source of the synchronization message.

For example, when a network device stores information based on receiving a first synchronization message (e.g., when the network device adds a flow table entry), the network device may store a source device identifier included in the first synchronization message. When the network device receives a second synchronization message to delete or modify the information (e.g., to delete or update a flow table entry), the network device may use the stored source device identifier to verify whether the second synchronization message was sent by the same source network device as the first synchronization message. For example, if the stored source device identifier matches the device identifier included in the second synchronization message, then the network device may perform the action to delete or modify the information. However, if the source device identifiers do not match, then the network device may prevent the action from being performed and/or may discard the second synchronization message. In this way, the stored information may be more secure.

As further shown in FIG. 4, process 400 may include identifying a downstream primary network device, associated with a primary message group, and a downstream secondary network device, associated with a secondary message group, to which the synchronization message is to be sent (block 430). For example, primary network device 220 may identify a downstream primary network device 220 and a downstream secondary network device 230 to which the synchronization message is to be sent. As described above in connection with FIG. 2, primary network device 220 may be included in a primary message group with a set of primary network devices 220, and may be included in a secondary message group with a set of secondary network devices 230. The primary message group and the secondary message group may each have a ring network topology, where information is sent in a single direction from upstream network devices to downstream network devices.

In some implementations, primary network device 220 may store information (e.g., in a data structure) that identifies network devices included in a primary message group and a secondary message group to which primary network device 220 belongs. Primary network device 220 may use this stored information to identify the downstream primary network device 220 and the downstream secondary network device 230, and may send the synchronization message to the downstream primary network device 220 and the downstream secondary network device 230, as described below. The downstream primary network device 220 and the downstream secondary network device 230 may process the synchronization messages in parallel, thereby reducing an amount of time required to synchronize routing system 210.

In some implementations, a network device, included in routing system 210, may be configured as a primary network device 220 or as a secondary network device 230. For example, routing system 210 may configure a network device as a primary network device 220 or as a secondary network device 230 based on input (e.g., provided by an administrator, an operator, a user, or a customer). Additionally, or alternatively, routing system 210 may configure network devices, included in routing system 210, based on a set of conditions associated with routing system 210. The set of conditions may include, for example, an amount of traffic being processed by routing system 210, an amount of traffic being processed by particular network device(s), a quantity of network devices included in routing system 210, information associated with one or more flows being processed by routing system 210 (e.g., information included in a packet, such as priority information or 5-tuple information), a customer requirement, or the like. Routing system 210 may configure a set of network devices differently when different conditions are detected, such as by configuring a different quantity of primary network devices 220, secondary network devices 230, primary message groups, and/or secondary message groups.

As further shown in FIG. 4, process 400 may include sending the synchronization message to the downstream primary network device and the downstream secondary network device (block 440). For example, a primary network device 220 that generates or receives a synchronization message may provide the synchronization message (or copies of the synchronization message) to two devices, such as another primary network device 220 included in the same primary message group as the primary network device 220, and a secondary network device 230 included in the same secondary message group as the primary network device 220. A secondary network device 230 that generates or receives a synchronization message may provide the synchronization message (or a copy of the synchronization message) to one device, such as a primary network device 220 or a secondary network device 230 included in the same secondary message group as the secondary network device 230.

In some implementations, if the downstream primary network device 220 is the initial primary network device 220 that initiated creation of the synchronization message or is included in a secondary message group with the secondary network device 230 that initiated creation of the synchronization message, then primary network device 220 may prevent the synchronization message from being sent to the downstream primary network device 220. This may conserve network resources and/or processing resources because the downstream primary network device 220 has already processed the synchronization message. For example, the downstream primary network device 220 may have already processed the synchronization message because the downstream primary network device 220 was the initial primary network device 220 to send the synchronization message within the primary message group.

In some implementations, the synchronization message may include an initial primary device identifier that identifies the initial primary network device 220 to send the synchronization message within the primary message group. Primary network device 220 may use the initial primary device identifier to prevent transmission of the synchronization message to the downstream primary network device 220 when the initial primary device identifier identifies the downstream primary network device 220.

Alternatively, in the above scenario, primary network device 220 may send the synchronization message to the downstream primary network device 220, and the downstream primary network device 220 may discard the synchronization message. Additionally, or alternatively, primary network device 220 may send an indication that all primary network devices 220, in the primary message group, have received the synchronization message. In some implementations, the downstream primary network device 220 may use this indication to start a synchronization timer. Additionally, or alternatively, the downstream primary network device 220 may start a synchronization timer after transmitting the synchronization message. In some implementations, the downstream primary network device 220 may restart the synchronization timer based on receiving the indication that all primary network devices 220 have received the synchronization message.

As further shown in FIG. 4, process 400 may include receiving a secondary completion message that indicates that all secondary network devices, included in the secondary message group, have received the synchronization message (block 450). For example, after primary network device 220 sends the synchronization message within a secondary message group to a secondary network device 230, each secondary network device 230 in the secondary message group may sequentially send the synchronization message downstream, within the secondary message group. When the last secondary network device 230 receives the synchronization message, the last secondary network device 230 may send a secondary completion message to primary network device 220. The secondary completion message may indicate that all secondary network devices 230, included in the secondary message group, have successfully received and/or processed the synchronization message. The secondary completion message may include a synchronization message or another type of message. Primary network device 220 may store the secondary completion message for later use, as described below.

As further shown in FIG. 4, process 400 may include sending a primary completion message to the downstream primary network device based on receiving the secondary completion message (block 460). For example, primary network device 220 may send a primary completion message to the downstream primary network device 220. The primary completion message may indicate that primary network device 220 has received a primary completion message from an upstream primary network device, and that primary network device 220 has received a secondary completion message indicating synchronization of a secondary message group associated with primary network device 220. In other words, the primary completion message may indicate that all upstream primary network devices 220 have been synchronized, and all secondary network devices 230 included in secondary message group with those upstream primary network devices 220 have been synchronized.

As further shown in FIG. 4, process 400 may include determining whether all network devices have received the synchronization message (block 470). For example, initial primary network device 220 may determine whether a primary completion message has been received from an upstream primary network device 220. If so, this may indicate that all network devices in routing system 210 (e.g., all primary network devices 220 and secondary network devices 230) have received and/or processed the synchronization message. If not, this may indicate that a message (e.g., a synchronization message, a primary completion message, or a secondary completion message) has been lost within the primary message group or one or more secondary message groups. In this case, initial primary network device 220 may re-send the synchronization message after a synchronization timer expires, as described below.

As further shown in FIG. 4, if all network devices have not received the synchronization message (block 470—NO), then process 400 may include re-sending the synchronization message (block 480). For example, if initial primary network device 220 does not receive a primary completion message before a synchronization timer expires, then initial primary network device 220 may re-send the synchronization message to a downstream primary network device 220, and may reset the synchronization timer.

The downstream primary network device 220 may determine whether a secondary completion message is stored. If so, the downstream primary network device 220 may send the synchronization message to another downstream primary network device 220 without sending the synchronization message to a secondary network device 230 (e.g., because the secondary network devices 230 in the secondary message group with the downstream primary network device 220 have been synchronized, as indicated by the secondary completion message). This may conserve network resources and/or processing resources. If a secondary completion message is not stored, then the downstream primary network device 220 may send the synchronization message to another downstream primary network device 220 and a downstream secondary network device 230 (e.g., as described in connection with block 440). This may assist with synchronization of stored information.

In some implementations, the synchronization timer may include a primary synchronization timer stored by initial primary network device 220. The primary synchronization timer may be initiated when initial primary network device 220 sends a synchronization message to a downstream primary network device 220. Upon expiration of the primary synchronization timer, initial primary network device 220 may re-send the synchronization message to the downstream primary network device 220.

Additionally, or alternatively, one or more primary network devices 220 may store a secondary synchronization timer. The secondary synchronization timer may be initiated when primary network device 220 sends a synchronization message to a downstream secondary network device 230. Upon expiration of the secondary synchronization timer, primary network device 220 may re-send the synchronization message to the downstream secondary network device 230. In some implementations, the secondary synchronization timer may be initialized with a shorter duration than the primary synchronization timer. This may reduce synchronization delays by permitting each primary network device 220 to control synchronization locally rather than waiting for the initial primary network device 220 to re-send a synchronization message.

As further shown in FIG. 4, if all network devices have received the synchronization message (block 470—YES), then process 400 may include storing an indication that the stored information has been synchronized across all primary network devices and all secondary network devices (block 490). For example, if initial primary network device 220 receives a primary completion message, then initial primary network device 220 may store an indication that synchronization was successful. In this way, process 400 may reduce an amount of time needed for synchronization due to parallel processing of synchronization messages, and may conserve an amount of bandwidth required for synchronization by eliminating transmission of synchronization messages to network devices that have already been synchronized.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein permit multiple network devices to synchronize stored information (e.g., flow table entries or other information stored in a data structure) in an efficient manner that conserves bandwidth and reduces delays associated with synchronization, thereby reducing packet processing errors and increasing throughput.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A primary device, comprising:
   a memory; and
   one or more processors to:
      generate or receive a synchronization message associated with synchronizing information stored by multiple devices;
      identify a downstream primary device, included in a primary group with the primary device, to which the synchronization message is to be sent,
         the primary group forming a ring network topology;
      identify a downstream secondary device, included in a secondary group with the primary device, to which the synchronization message is to be sent,
         the downstream secondary device being different from the downstream primary device, and
         the secondary group forming another ring network topology;
      send the synchronization message to the downstream primary device and the downstream secondary device;
      receive a secondary completion message that indicates that all secondary devices, included in the secondary group, have received the synchronization message;
      receive a first primary completion message from an upstream primary device included in the primary group; and
      send a second primary completion message to the downstream primary device after receiving the secondary completion message and after receiving the first primary completion message to conserve bandwidth.

2. The primary device of claim 1, where the synchronization message is associated with synchronizing tables stored by the multiple devices; and
   where the one or more processors are further to:
      update a table entry stored by the primary device, based on the synchronization message.

3. The primary device of claim 1, where the primary device is included in a single primary group and a single secondary group.

4. The primary device of claim 1, where the downstream primary device is included in another secondary group, different from the secondary group in which the primary device is included, and is not included in the secondary group in which the primary device is included.

5. The primary device of claim 1,
   where the one or more processors are further to:
      determine that a synchronization timer has expired before receiving the first primary completion message; and
      re-send the synchronization message to the downstream primary device based on determining that the synchronization timer has expired.

6. The primary device of claim 1,
   where the one or more processors are further to:
      store an indication that the information stored by the multiple devices has been synchronized based on receiving the first primary completion message.

7. A method, comprising:
   generating or receiving, by a primary device, a synchronization message associated with synchronizing information stored by the primary device and other devices;
   identifying, by the primary device, a downstream primary device to which the synchronization message is to be sent,
      the downstream primary device being included in a primary group with the primary device,
      the primary group forming a ring network topology, and
      the downstream primary device being downstream from the primary device in the ring network topology;
   identifying, by the primary device, a downstream secondary device to which the synchronization message is to be sent,
      the downstream secondary device being included in a secondary group with the primary device,
      the secondary group forming another ring network topology, and
      the downstream secondary device being downstream from the primary device in the other ring network topology;
   selectively sending, by the primary device, the synchronization message to the downstream primary device and the downstream secondary device for parallel processing;
   receiving, by the primary device, a secondary completion message that indicates that all secondary devices, included in the secondary group, have received the synchronization message;
   receiving, by the primary device, a first primary completion message from an upstream primary device included in the primary group; and
   sending, by the primary device, a second primary completion message to the downstream primary device after receiving the secondary completion message and after receiving the first primary completion message to conserve bandwidth.

8. The method of claim 7, further comprising:
   determining that a synchronization timer has expired; and
   re-sending the synchronization message to the downstream primary device based on determining that the synchronization timer has expired.

9. The method of claim 7, further comprising:
   determining that a synchronization timer has expired; and
   re-sending the synchronization message to the downstream secondary device based on determining that the synchronization timer has expired.

10. The method of claim 7, where selectively sending the synchronization message comprises:
  determining that a time-to-live counter, included in the synchronization message, has expired,
  the time-to-live counter being based on a quantity of devices included in the primary group; and
  dropping the synchronization message based on determining that the time-to-live counter has expired.

11. A routing system, comprising:
  a primary message group to be used for synchronizing stored information,
    the primary message group including a plurality of primary network devices,
    the plurality of primary network devices being configured with a first configuration regarding synchronizing the stored information, and the primary message group forming a ring network topology; and
  a secondary message group to be used for synchronizing the stored information,
    the secondary message group including a single primary network device, of the plurality of primary network devices, and a plurality of secondary network devices,
    each secondary network device, of the plurality of secondary network devices, being included in a single secondary message group,
    the plurality of secondary network devices being configured with a second configuration regarding synchronizing the stored information,
    the secondary message group forming a different ring network topology, and
    the single primary network device being to:
      receive a secondary completion message from a secondary network device of the plurality of secondary network devices,
      receive a first primary completion message from an upstream primary network device of the plurality of primary network devices, and
      send a second primary completion message to a downstream primary network device, of the plurality of primary network devices, after receiving the secondary completion message and after receiving the first primary completion message to conserve bandwidth.

12. The routing system of claim 11, where the first configuration causes the single primary network device to send a synchronization message, used to synchronize the stored information, to:
  the downstream primary network device, and
  a downstream secondary network device, of the plurality of secondary network devices, included in the secondary message group.

13. The routing system of claim 11, where the second configuration causes the secondary network device, of the plurality of secondary network devices, to send a synchronization message, used to synchronize the stored information, to:
  the downstream primary network device, or
  a downstream secondary network device, of the plurality of secondary network devices, included in the secondary message group with the secondary network device.

14. The routing system of claim 11, where the routing system includes a single primary message group.

15. The routing system of claim 11, where the routing system is to:
  configure a plurality of network devices, included in the routing system, to form the primary message group and the secondary message group,
    the plurality of network devices including the plurality of primary network devices and the plurality of secondary network devices.

16. The routing system of claim 15, where the routing system, when configuring the plurality of network devices, is to:
  configure the plurality of network devices based on at least one of:
    user input, or
    a set of conditions associated with the routing system.

17. The routing system of claim 11, where the secondary message group is one of a plurality of secondary message groups included in the routing system.

18. The primary device of claim 1,
  where the synchronization message includes a first device identifier, and
  where the one or more processors are further to:
    receive a different synchronization message that includes a second device identifier;
    determine that the second device identifier does not match the first device identifier; and
    discard the different synchronization message based on determining that the second device identifier does not match the first device identifier.

19. The method of claim 7, further comprises:
  determining that the primary device initiated creation of the synchronization message; and
  preventing, based on determining that the primary device initiated creation of the synchronization message, the synchronization message from being sent to the downstream primary device.

20. The method of claim 7, where the synchronization message includes a device identifier associated with the primary device, and
  where the method further includes:
    using the device identifier to prevent sending the synchronization message to the downstream primary device when the downstream primary device is the primary device.

* * * * *